O. MOBBERLY.
BRAKE FOR MINE CARS.
APPLICATION FILED FEB. 26, 1912.
1,067,050.
Patented July 8, 1913.
Fig. 1.
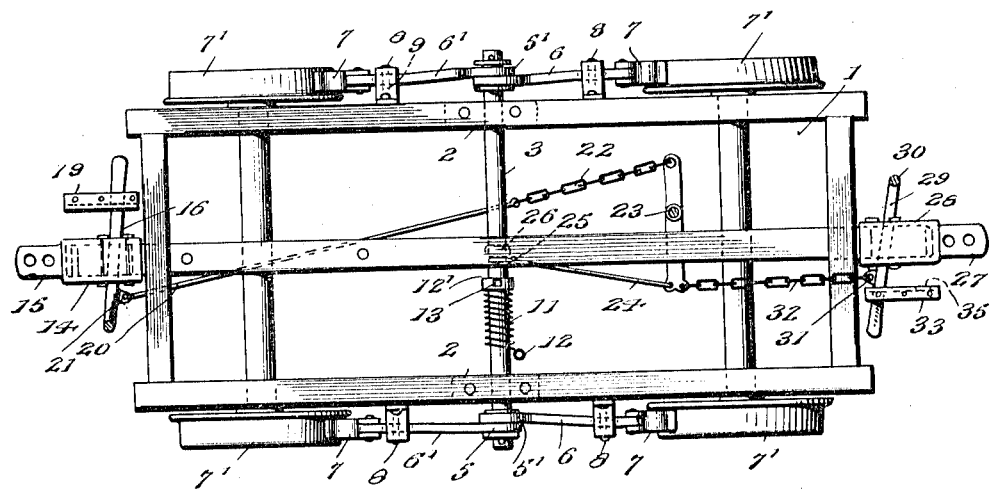
Fig. 2.
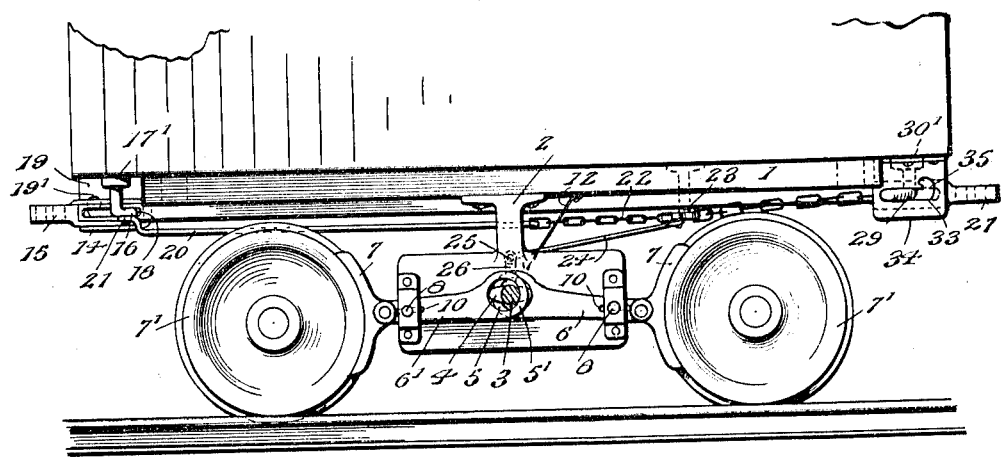
Fig. 3.   Fig. 4.
Witnesses
T. A. Smith
Inventor
Ora Mobberly
By Charles S. Wilson
Attorney

UNITED STATES PATENT OFFICE.

ORA MOBBERLY, OF CORBIN, KENTUCKY.

BRAKE FOR MINE-CARS.

1,067,050.  Specification of Letters Patent.  Patented July 8, 1913.

Application filed February 26, 1912. Serial No. 680,023.

*To all whom it may concern:*

Be it known that I, ORA MOBBERLY, a citizen of the United States, residing at Corbin, in the county of Whitley and State of Kentucky, have invented certain new and useful Improvements in Brakes for Mine-Cars, of which the following is a specification.

This invention relates to car brakes and has especial reference to car brakes adapted for use with mine cars.

The invention has for its object to provide a system of brakes and apparatus by means of which the brakes may be instantly set to brake the car wheels when the car is set in motion and which when the car comes to a standstill will automatically be set to brake the car wheels.

The invention further has for its object to provide an improved car braking apparatus which can be automatically operated to brake the car wheels and can be released by hand.

With the above and other objects in view, this invention resides in the novel features of construction, formations, combinations and arrangements of parts to be hereinafter more fully described and claimed, and illustrated in the accompanying drawings, in which:—

Figure 1 is a plan view of the under side of a car showing the improved brake apparatus constructed in accordance with this invention applied thereto. Fig. 2 is a side view of the lower portion of the car and the running gear with the improved brake apparatus applied thereto. Fig. 3 is an enlarged detailed view in perspective of a locking plate and a hand lever employed in connection with the apparatus. Fig. 4 is a view in perspective of several of the parts with a portion of shaft broken away employed in connection with this invention.

1 indicates the bottom of a car having transversely mounted in bearings 2 thereon a transverse rotary shaft 3 the ends of which project beyond the sides of the bottom of the car, and are provided adjacent to each end with a pair of oppositely projecting cams 4 located on opposite sides of the shaft 3 in staggered relation to each other. The cams 4 on the ends of the shaft 3 are positioned within circular openings 5 formed in the enlarged ends 5' of the sliding bars
6 and 6'. The outer ends of these bars are pivotally connected with brake shoes 7 which are adapted to engage the car wheels 7'. The sliding bars 6 and 6' extend through guide brackets 8 mounted on the car truck and have guide pins 9 which project through slots 10 formed in said bars. The brake shoes 7 are held in engagement with the car wheel 7' by means of a coiled spring 11 mounted on the shaft 3 and connected at one end as at 12 with the bottom of the car and at the other end to the clamping ring 12' on the shaft 3 secured thereto by a set screw 13.

Slidably mounted in any suitable manner on one of the draw bars 14 of the car is what may be termed a clevis 15 which is adapted to be connected to the draft apparatus to which the mules which draw mine-cars are attached. The slidable clevis 15 is connected to a lever 16 mounted transversely in the draw bar 14 and having an upturned end 17 which is pivotally engaged with the car body as at 17'. The lever 16 projects through an oblong slot 18 in a hanger plate 19 suspended from the car body and is movable therein and adapted to be moved into locking engagement with a recess 19' extending from the end of said slot 18. One end of a rod 20 is pivotally connected to a lug 21 on the lever 16 and extends diagonally beneath the bottom of the car and is connected by a chain 22 with one end of a double lever 23 pivoted to the bottom of the car. The other end of lever 23 is pivoted to one end of a rod 24 the other end of which is pivotally connected to a pin 25 mounted on a lug 26 projecting from the shaft 3 by means of which pin and lug the shaft 3 is partially rotated together with the cams 4 when pressure is applied to the draw bar 14 releasing the brake shoes 7 from the wheels 7'.

The brake shoe 7 being normally held in engagement with the car wheel 7' by means of the tension of coiled spring 11 upon pulling the clevis 15 the lever 16 will be acted upon to pull the rod 20 and chain 22 thereby causing through the lever 23 the rod 24 to pull on the lug 26 so as to rotate the shaft 3 and thereby through the cams 4 in the openings 5 in the brake lever arm 6 cause the brake shoes 7 to be released from the wheel 7'. It will be seen from the foregoing that as soon as tension is released from the clevis 15 that the reaction of the spring 11 which is under tension will cause the brake shoe 7 to be instantly thrown into braking engagement with the wheels 7'.

The brake shoes 7 may be held away from engagement with the wheels 7' by moving one of the levers 16 outwardly and upwardly into the corresponding slot 19'. When a pull is exerted upon the corresponding clevis, said lever will move outwardly and drop into the horizontal portion of its slot and allow the brakes to set when the pull is discontinued.

Located at the other end of the car is a smaller clevis 27 slidably mounted in the draw bar 28 and connected with a lever 29 similar to the lever 16 and having an upturned end 30 which is pivotally engaged with the body of the car as shown at 30'. The lever 29 is provided with a lug 31 to which is connected one end of a chain 32, the other end of said chain being connected with one end of the double lever 23. The lever 29 projects through a slot 33 in a plate 34 suspended from the car body said plate 34 being similar to the plate 19 and being provided at one end of the slot 33 with a notch or recess 35 adapted to hold the lever 29 in locking engagement with the plate 34. The action of the clevis 27 upon the lever 29 is similar to that of the clevis 15 on the lever 16, a pull on the clevis 27 acting on the chain 32 to pull the lever 23 and through the rod 24 and the lug 26 to rock the shaft 3. If desired either the lever 16 or the lever 29 may be manually released from locking engagement with the locking plate to permit the spring 11 to set the brake shoes.

It will be seen from the foregoing description that an efficient braking apparatus is provided especially useful in mine-cars whereby on the car being drawn forward the brakes will be automatically released and upon the car coming to a rest will be automatically set.

Having described the invention I claim:

1. A car brake mechanism, comprising a pair of brake shoes at each side of the car adjacent to the wheels, a transverse rotary shaft, a pair of cams oppositely disposed and integral with said shaft, a pair of sliding bars pivoted to the adjacent brake shoes, heads on the free ends of said bars provided with circular seats, each seat adapted to receive the shaft and one of said cams, a spring normally holding said brake shoes in contact with the wheels, an operative lever mechanism connected with said rotary shaft, a manually operated lever connected with said operative lever mechanism, a draft device connected with and controlling said manually operated lever and means for locking said manually operated lever.

2. A car brake mechanism, comprising a pair of brake shoes at each side of the car adjacent to the wheels, a transverse rotary shaft, a pair of cams oppositely disposed and spaced longitudinally out of alinement with each other formed with said shaft, a pair of sliding bars pivoted to the adjacent brake shoe heads on the free ends of said sliding bars provided with circular seats, each seat adapted to receive the shaft and one of said cams to reciprocate the brake shoes into and out of contact with the car wheels on the partial rotation of the shaft, a coiled spring connected with said shaft holding said shoes normally in engagement with the wheels, and a brake operating mechanism, consisting of a rod eccentrically connected with said rotary shaft, a double arm lever pivotally connected to one end of said rod, a draft extension connected to the other end of said double lever and a draft device connected with said draft extension.

In testimony whereof I affix my signature in presence of two witnesses.

ORA MOBBERLY.

Witnesses:
A. E. MOBBERLY,
JAS. DOWNING.